(12) United States Patent
Takahashi et al.

(10) Patent No.: US 6,539,481 B1
(45) Date of Patent: Mar. 25, 2003

(54) COMPUTER RESOURCE ASSIGNMENT OF A TEMPORARY USER FROM A COMPUTER POOL OF AVAILABLE IDENTIFIERS

(75) Inventors: Toshiya Takahashi, Chiba-ken (JP); Tetsuro Kimura, Tokyo (JP); Tetsuro Muranaga, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/184,901

(22) Filed: Nov. 3, 1998

(30) Foreign Application Priority Data

Nov. 4, 1997 (JP) ............................................ 09-302026

(51) Int. Cl.⁷ ........................ G06F 11/30; G06F 15/173; G06F 15/16
(52) U.S. Cl. ........................ 713/201; 713/223; 713/226; 713/229
(58) Field of Search ........................ 700/99, 124, 237; 705/8; 707/205; 709/104, 102, 223, 225, 226, 237, 229; 713/201, 202, 165, 166, 161, 229, 193, 200

(56) References Cited

U.S. PATENT DOCUMENTS

| 5,606,663 A | * | 2/1997 | Kadooka |
| 5,774,650 A | * | 6/1998 | Chapman et al. ............ 713/165 |
| 5,923,842 A | * | 7/1999 | Pedersen et al. |
| 6,044,471 A | * | 3/2000 | Colvin |
| 6,055,637 A | * | 4/2000 | Hudson et al. .............. 713/166 |
| 6,078,955 A | * | 6/2000 | Konno et al. ................ 713/200 |

OTHER PUBLICATIONS

System Administration Guide, vol. 1, SunSoft,, Nov. 1995, pp. 37–68.

* cited by examiner

Primary Examiner—Gail Hayes
Assistant Examiner—Jenise Jackson
(74) Attorney, Agent, or Firm—Oblon, Spivak, McClelland, Maier & Neustadt, P.C.

(57) ABSTRACT

In a computer resource assignment apparatus, a registration request processing section assignes a computer resource to a user in response to a temporary registration request from the user. A computer resource management section manages the computer resource assigned to the user of the temporary registration request by unit of each user.

20 Claims, 10 Drawing Sheets

| UID | GID | USER NAME | PASSWORD | HOME DIRECTORY | USE PERIOD | LAST USE DATE | ... |
|-----|-----|-----------|----------|----------------|------------|---------------|-----|
| 100 | 010 | yamada | sunSun | /home/yamada | 8/01 0:00 | 7/10 20:00 | |
| 101 | 020 | tommy | xyzabc | /home/tommy | 7/15 12:00 | 7/13 12:00 | |
| 102 | 020 | hanako | a1b2c3 | /home/hanako | 7/25 0:00 | USING | |
| 103 | | | | | | | |
| ... | | | | | | | |
| 41 | 42 | 43 | 44 | 45 | 46 | 47 | |

*FIG. 2*

| UID | GID | USER NAME | PASSWORD | HOME DIRECTORY | USE PERIOD | LAST USE DATE | ... |
|-----|-----|-----------|----------|----------------|------------|---------------|-----|
| 100 | 020 | kimura | abcd1 | /home/kimura | 10/31 0:00 | 10/25 15:30 | |
| 101 | 010 | takahashi | xyzw2 | /home/takahshi | 11/10 12:00 | USING | |
| 102 | (020) | (uchida) | (papamama) | (/home/uchida) | (11/15 12:00) | (USING) | |
| 103 | | | | | | | |
| ... | | | | | | | |
| 198 | 020 | tanaka | akanat | /home/tanaka | 10/30 12:00 | 10/15 9:00 | |
| 199 | | | | | | | |
| 200 | | | | | | | |
| 411 | 412 | 413 | 414 | 415 | 416 | 417 | |

| UID | GID | USER NAME | PASSWORD | HOME DIRECTORY | USE PERIOD | LAST USE DATE | ... |
|---|---|---|---|---|---|---|---|
| 100 | 020 | kimura | abcd1 | /home/kimura | 10/31 0:00 | USING | |
| 101 | 010 | takahashi | xyzw2 | /home/takahashi | 11/10 12:00 | 10/28 9:00 | |
| 102 | 020 | uchida | papamama | /home/uchida | 11/15 12:00 | 10/30 20:00 | |
| ... | | | | | | | |
| 198 | | | | | | | |
| 199 | | | | | | | |
| 200 | | | | | | | |

421　422　423　424　425　426　427

ANOTHER OFFICE FOR THE USER

COMPUTER RESOURCE ASSIGNMENT OF A TEMPORARY USER FROM A COMPUTER POOL OF AVAILABLE IDENTIFIERS

BACKGROUND OF THE INVENTION

1. Field of the Invention

The present invention relates to a computer resource assignment apparatus and a method for effectively assigning a computer resource used for a temporary registered user.

2. Description of the Related Art

In a network system, a plurality of computers (for example, a terminal or EWS used commonly) are connected by a network for access to use computer resources such as a file, a directory, disk space, or to commonly use the file. In this network system, in order to maintain security, only a preregistered user can use the system or execute log-in. As for registration of the user, the user is registered to a user list and the computer resource is assigned to the user. As the computer resource, access right information such as a user ID (for example, numerals, English letters, or their combination), a group ID, personal information such as a user name and a password, a resource related to a data memory function such as a file, a directory, and disk space correspond. In some systems, the user ID and the user name are commonly used.

At a predetermined time such as log-in, the registered user inputs the user name previously assigned and the password previously registered in order to use the system or execute log-in. In this case, by controlling access based on the access right information such as the user ID and the group ID assigned to the registered user, access to the computer resource such as the file, the directory, and the disk space, are suitably limited in order to maintain security.

In this prior network system, the registration of the user is executed by a system manager. Even if an unregistered user wants to temporarily use the system, the unregistered user must be regularly registered as new user. Accordingly, whenever the unregistered user temporarily uses the system, the system manager must register a new user ID and user name of the unregistered user to the system. In addition to this, when this user finishes use of the system, the system manager must delete the registration of the user. In case the system manager is absent, the user registration is not executed and the user can not temporarily use the network system.

Nowadays, not only the above-mentioned network system but also portable device such as notebook personal computers and portable information terminals have spread rapidly. Therefore, the portable device is often connected to the network system. Especially, as for data managed by the network system to which a user is registered in this office, the data are often downloaded to a portable device of the user and accessed in another office to which the user has gone. Furthermore, the sending/receiving of electronic mail and access to WWW through modem are frequently executed. In addition to this, by temporarily connecting the portable device to a network system in another office (the user is not registered to this network system), the number of user requests for use the network environment increases.

In this way, in case an unregistered user temporarily uses his portable device by connecting to the network system at a new location, the unregistered user must be registered to the system as a new user. In this case, by a demand of the system to control access based on the access right information, two operations are necessary. The first operation is a notification of the user ID and the group ID assigned to the user from the system to his portable device. The second operation is the acquisition and reservation of the access right information in the portable device. However, these two operations are independently executed in the system side and the portable device side.

SUMMARY OF THE INVENTION

It is an object of the present invention to provide a computer resource assignment apparatus and a method for effectively registering a temporary user in response to a request from the user in a computer resource assignment system.

It is another object of the present invention to provide a portable device and a method for effectively using the access right information acquired from the computer resource assignment system.

According to the present invention, there is provided a computer resource assignment apparatus, comprising: a registration request processing means for assigning a computer resource to a user in response to a temporary registration request from the user; and a computer resource management means for managing the computer resource assigned to the user of the temporary registration request.

Further in accordance with the present invention, there is also provided a portable device used by a user by connecting to a network system, comprising: an access right information acquisition means for acquiring access right information of a computer resource assigned to the user temporarily registered to the network system from a computer which manages the computer resource in the network system; an access right information preservation means for preserving the access right information acquired by said access right information acquisition means; and a network access means for accessing the network system by using the access right information preserved in said access right information preservation means.

Further in accordance with the present invention, there is also provided a computer resource assignment method, comprising the steps of: assigning a computer resource to a user in response to a temporary registration request from the user; and managing the computer resource assigned to the user of the temporary registration request.

Further in accordance with the present invention, there is also provided a management method in a portable device used for a user by connecting to a network system, comprising the steps of: acquiring access right information of a computer resource assigned to the user temporarily registered to the network system from a computer which manages the computer resource in the network system; preserving the access right information acquired; and accessing the network system using the access right information preserved.

Further in accordance with the present invention, there is also provided a computer readable memory containing computer-readable instructions, comprising: an instruction means for causing a computer to assign a computer resource to a user in response to a temporary registration request from the user; and an instruction means for causing a computer to manage the computer resource assigned to the user of the temporary registration request.

Further in accordance with the present invention, there is also provided a computer readable memory containing computer-readable instructions used in a portable device by connecting to a network system, comprising: an instruction means for causing a computer to acquire an access right information of a computer resource assigned to a user temporarily registered to the network system from a computer which manages the computer resource in the network system; an instruction means for causing a computer to preserve the access right information acquired; and an instruction means for causing a computer to access the network system using the access right information preserved.

BRIEF DESCRIPTION OF THE DRAWINGS

FIG. 2 is a schematic diagram of a content in a computer resource list.

FIG. 4 is a schematic diagram of the computer resource list to explain an assignment method of the user identifier.

FIG. 7 is a schematic diagram of the computer resource list to explain a notice method of the use period.

DETAILED DESCRIPTION OF THE PREFERRED EMBODIMENTS

Hereinafter, embodiments of the present invention will be explained by referring to the figures. According to the embodiments, temporary user registration and deletion of the registration can be automatically executed without the system manager. In the following explanation, a user temporarily registered is called a temporary registered user and a user regularly registered by the system manager is called a regular registered user.

First, the first embodiment of the present invention is explained. The computer resource assignment system is connected to the network system to which a plurality of user terminals, a shared disk apparatus, various kinds of other apparatus (for example, a server apparatus, a printer apparatus, a communication apparatus) are connected. In the computer resource assignment system, the computer resources to be assigned (for example, data memory such as a file, a directory, and disk space) can be used by the unregistered user who requests a temporary registration. Especially, in the computer resource assignment system, the first function manages the computer resource to be assigned to the temporary registered user (the computer resource in a wide sense: the access right information such as user ID and group ID, the personal information such as user name and password, the data memory such as file, directory, and disk space), and second function executes registration and deletion of the temporary registered user. In the first embodiment, the computer resource assigned to the temporary registered user and the computer resource assigned to the regular registered user exist independently.

The network system includes a function to manage the computer resources assigned to the regular registered user. However, a detailed explanation of this function is omitted.

Figure 1:
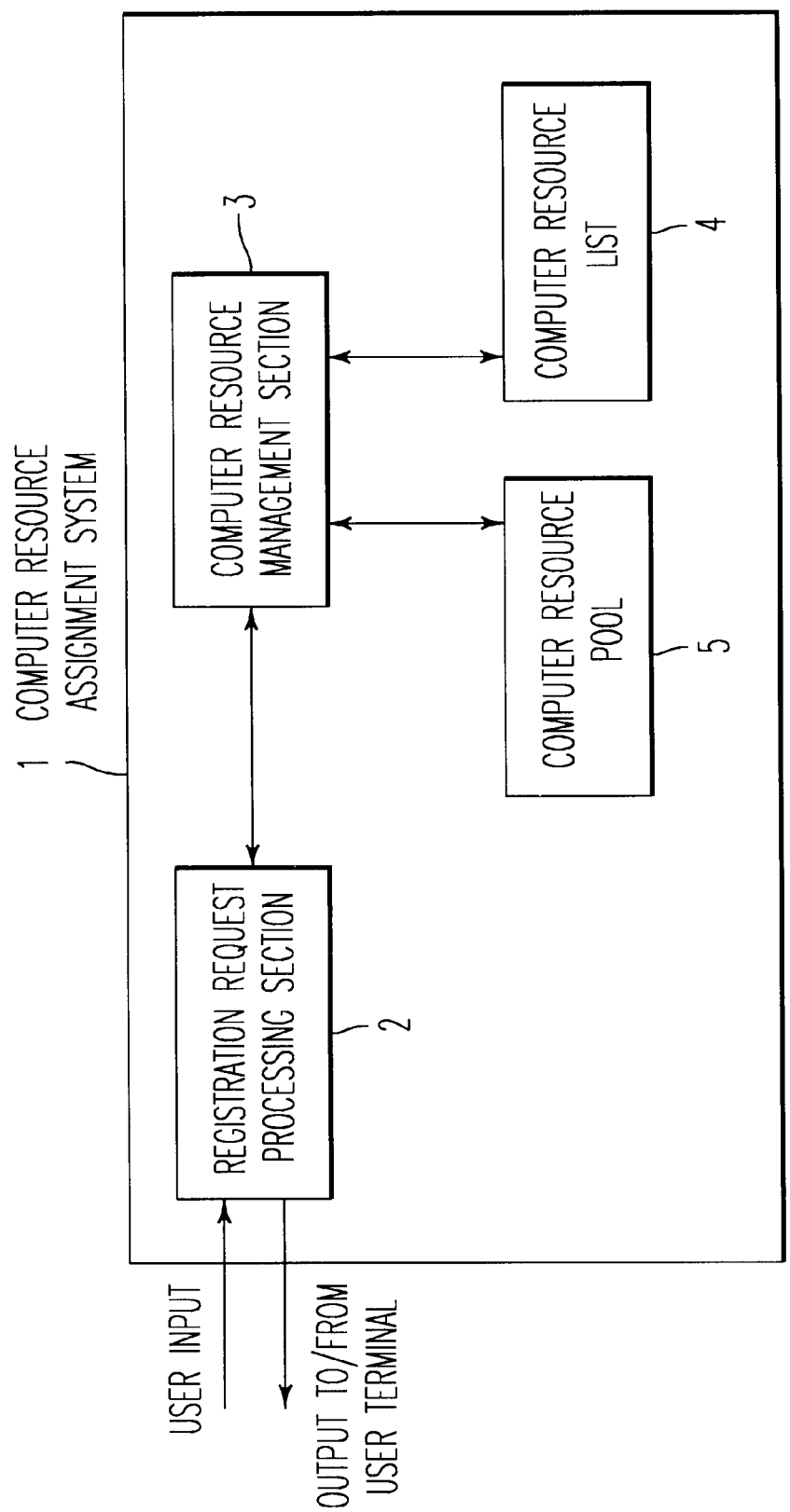
FIG. 1 is a block diagram of the computer resource assignment apparatus according to a first embodiment of the present invention.

FIG. 1 is a block diagram of the computer resource assignment system according to the first embodiment of the present invention. As shown in FIG. 1, the computer resource assignment system 1 consists of a registration request processing section 2, a computer resource management section 3, a computer resource list 4, a computer resource pool 5.

The registration request processing section 2 receives a request of temporary registration inputted by the unregistered user through a user terminal, and executes registration processing such as input of the user name and the password through the user terminal.

The computer resource management section 3 manages the computer resources maintained for the temporary registration user. For example, the processing necessary for registration such as retrieval of a free user name, checking for a duplicate user name, management of the registration limit of the temporary registered user, and deletion of registration of the temporary registered user who reached the registration limit (and release of the computer resources), are executed. In the computer resource management section 3, information of the computer resource to be assigned to the temporary registered user (for example, the group ID for the temporary registered user, a set condition (kind and number of characters) of the user name and the password, and the home directory) are previously memorized. Furthermore, a set condition of temporary registered user's period of use (for example, thirty days from registration data) is previously registered.

The computer resource list 4 stores the access right information assigned to the temporary registered user and the personal information of the temporary registered user. In the computer resource list, a user ID (UID), a group ID (GID), a user name, a password, a home directory, a use period, and a last use date are stored. In the first embodiment, all of the user IDs for the temporary registered user are previously registered in the computer resource list 4. As for unused user ID, corresponding area in the computer resource list 4 is blank.

FIG. 2 is a schematic diagram of content of the computer resource list 4. The user ID 41 is an identifier assigned to the temporary registered user. Each identifier is unique in this network system and not duplicated by the identifier of a regular registered user. The group ID 42 is an identifier which limits the computer resources to be accessed by the temporary registered user. For example, the group ID whose access right is lowest is assigned to the temporary registered user for security reasons. The user name 43 and the password 44 are input by the user in case of temporary registration, and used until they are deleted by the computer resource management section 3. The user name is unique in this network system and not duplicated by a user name of a regular registered user. Therefore, in case of registration, the user name must be checked to ensure that it is not in use by either a temporary registered user or regular registered user. Conversely, as for the regular registered user, the user name must be checked to ensure that it is not in use by either a regular registered or a temporary registered user. The home directory 45 is information representing a home directory assigned to the user. For example, as for the user ID "100" in FIG. 2, the home directory exists in "/home/yamada". The use period 46 is an effective period of registration for the temporary registration user. The last use date 47 is a date when the temporary registered user used the system last. As for the last use date, for example, the data when the user executed log-out last may be used. In this case, the user terminal informs the user ID of the user who executed log-out to the computer resource assignment system, or the computer resource assignment system monitors generation of the log-out. In FIG. 2, "USING" in cell of the last use date represents that the temporary registered user is using the system at the present time. In order to detect this status, the user terminal informs the user ID of the user who executed login (log-out) to the computer resource arrangement system, or the computer resource arrangement system monitors generation of log-in (log-out).

The computer resource pool 5 is the memory area previously reserved for assignment to the temporary registered user, and corresponds to a disk or other memory device to store data indicated by the home directory. In case the temporary registered user uses the home directory assigned to himself, data transmission is executed between the user terminal and the computer resource pool 5 through the network.

Figure 3:
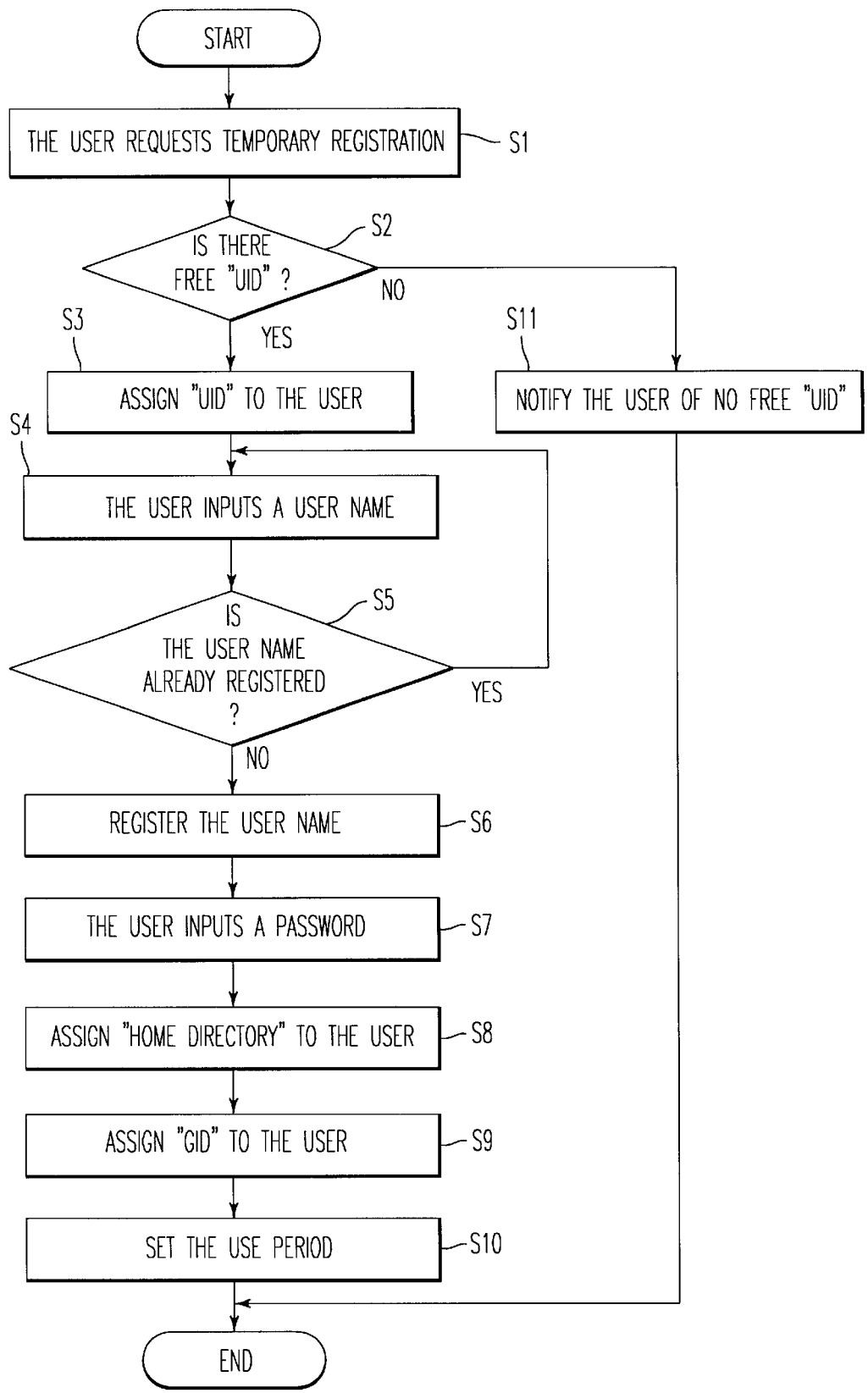
FIG. 3 is a flow chart of processing of the computer resource assignment method according to the first embodiment of the present invention.

Next, temporary registration processing in the computer resource assignment system is explained. FIG. 3 is a flow chart of the processing of temporary registration and computer resource assignment when an unregistered user requests temporary registration.

First, the unregistered user inputs a request for temporary registration from his user terminal to the computer resource assignment system (S1). When the registration request processing section 2 receives the request for temporary registration, the registration request processing section 2 sends the request to the computer resource management section 3. By referring to the computer resource list 4, the computer resource management section 3 checks whether a free user ID exists in the computer resource list 4 (S2). If the free user ID does not exist in the computer resource list 4, the computer resource management section 3 informs the registration request processing section 2 that all of user IDs are already used. The registration request processing section 2 informs the user terminal that the user ID is not secured (S11) and the processing is completed. If the free user ID exists in the computer resource list 4, the computer resource management section 3 secures one free user ID and sends it to the registration request processing section 2 (S3). In case a plurality of the free user IDs exist in the computer resource list 4, a free user ID located upper most in the list is selected. Otherwise, a free user ID lower located below and nearest to a previous assigned user ID in the list may be selected or one free user ID may be selected at random from the list. Assume that content of the computer resource list is shown in FIG. 4 and the user ID "102" is the only free (unused) user ID. In this case, the user ID "102" is assigned to the user of the temporary registered request. (In FIG. 4, information in "( )" represents content registed in processing after that.)

The registration request processing section 2 informs the user ID to the user terminal, and requests the user to input a user name through the user terminal (for example, a message is displayed through the user terminal). When the user inputs his user name through the user terminal (S4) and the user name is sent from the user terminal, the user name is sent from the registration request processing section 2 to the computer resource management section 3. The computer resource management section 3 checks whether the user name is already registered by referring to the computer resource list 4 (S5). If the same user name is already registered in the computer resource list 4, the computer resource management section 3 informs the registration request processing section 2 that the input user name is already registered. The registration request processing section 2 requests the user to input another user name through the user terminal. This processing is repeated until an unregistered user name is inputted by the user. If an unregistered user name is inputted, the computer resource management section 3 registers this user name in the computer resource list 4 (S6), and informs the registration request processing section 2 that the user name is registered. For example, as shown in FIG. 4, assume that the user name "uchida" is inputted. In this case, the user name "uchida" is not already registered. Therefore, the user name "uchida" is newly registered as it is. The registration request processing section 2 informs the user name that the user name is registered, and requests the user to input a password through the user terminal.

When the user inputs the password through the user terminal (S7) and the password is sent from the user terminal, this password is sent from the registration request processing section 2 to the computer resource management section 3. The computer resource management section 3 registers this password in the computer resource list 4, and informs the registration request processing section 2 that the password is registered. For example, as shown in FIG. 4, assume that the password "papamama" is newly registered. In the usual case, a log-in name and the password include a limited number of characters. Therefore, in case the characters whose number is above the limit is inputted, the characters whose number is below the limit may be selected.

Next, the registration request processing section 2 requests the computer resource management section 3 to secure an area of the home directory in order to newly assign the home directory to the user. The computer resource management section 3 assigns an empty area in the computer resource pool 5 and registers this empty area to the computer resource list 4 (S8). The computer resource management section 3 informs the registration request processing section 2 that the home directory is newly created. The registration request processing section 2 informs the user that the home directory is newly created. For example, in FIG. 4, the home directory "/home/uchida" is newly created.

Next, the computer resource management section 3 sets the group ID (S9). For example, in FIG. 4, as for the user ID "102", the group ID "020" for the temporary registered user is set. In this case, as for the temporary registered user, the group ID whose use of resource (data memory function) is more limited in comparison with the regular registered user is assigned in order to maintain security. However, as for a predetermined user of the temporary registration request, the group ID for the regular registered user may be assigned after personal confirmation. For example, in FIG. 4, the group ID "010" for the regular registered user is assigned to the temporary registered user of the user ID "101".

Last, the computer resource management section 3 sets the use period (S10) and the processing is completed. For example, the use period can be thirty days or one month, measured from the date of registration. In FIG. 4, the registration time is "October, 15th, 12:00 and the use period is set to end on "November, 15th, 12:00". The use period from Oct.15 to Nov.15 is 31 days. In this case, in proportion to the group ID for the temporary registered user, the use period may be changed. For example, in case of the group ID "020", the use period is thirty days, and in case of the group ID "010", the use period is sixty days.

As mentioned-above, in the first embodiment, when the user requests the temporary registration, the computer resource assignment system dynamically assigns the free user ID. Therefore, even if the system manager is absent, the temporary user registration can be effectively executed.

The user information with which the user was temporarily registered in the past may be stored in the computer resource management section 3. If this user is temporarily registered again, the user ID and the group ID equal to those set in previous temporary registeration may be set again. In this case, in order to confirm this user as the previous temporary registered user, this user must input the user name and the password set in the previous temporary registration. If the inputted user name and password are the same as those in the previous temporary registration, this user is temporarily registered again. However, if the user ID set in the previous temporary registration is used by another user, another free user ID is assigned to this user. Furthermore, even if the user ID set in the previous temporary registration is free, the user name in the previous temporary registration may be used by another user. Therefore, the inputted user name must be checked whether it is doubly used.

In the first embodiment, the computer resources assigned for the temporary registered user and the computer resources assigned for the regular registered user independently exist. However, other management methods may be adopted. For example, the temporary registered user and the regular registered user are not discriminated. In short, the user ID assigned to the temporary registered user is not previously secured, and a free user ID in the computer resource list is assigned to the registered user in order. Furthermore, the computer resource pool 5 is not previously prepared. In this case, the memory area (computer resource) is only assigned to the user if the memory area is secured in response to the temporary registration request. If the memory area is not secured, the user is not temporarily registered.

In the first embodiment, the user ID for the temporary registration is previously stored in the computer resource list 4. As for the unused user ID (free user ID), corresponding area in the computer resource list 4 is blank. However, only the user ID in use may be registered in the computer resource list 4. In this case, limit information of the user ID for the temporary registration is stored in the computer resource management section 3. When searching for an unused user ID, the user IDs registered in the computer resource list 4 are excluded from the limit information of the user ID, and the remaining user ID in the limit information is used as the unused user ID. Alternatively, a list of the unused user ID may be set in the computer resource management section 3. In this case, searching processing of the computer resource management section 3 is omitted.

Figure 5:
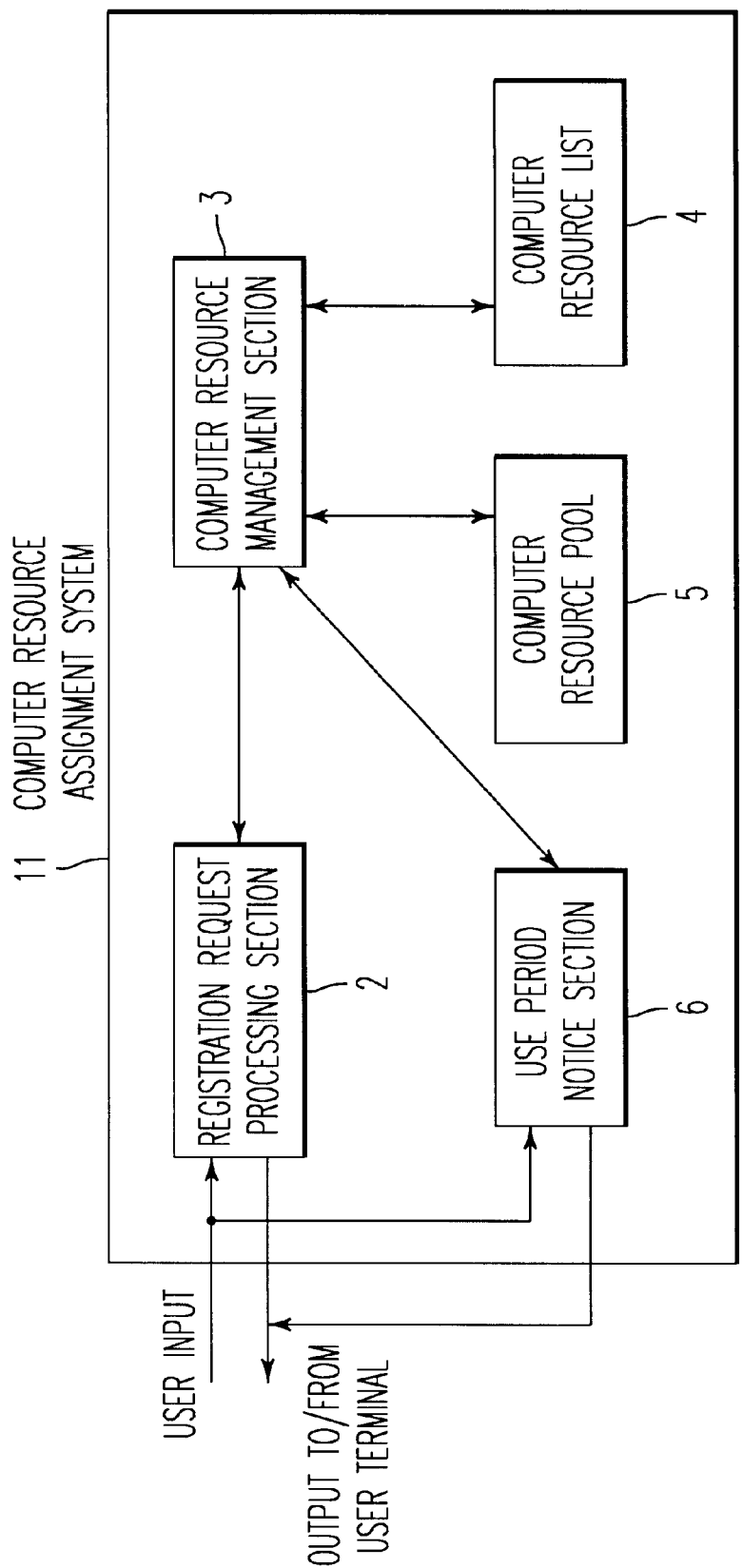
FIG. 5 is a block diagram of the computer resource assignment apparatus according to a second embodiment of the present invention.
Figure 6:
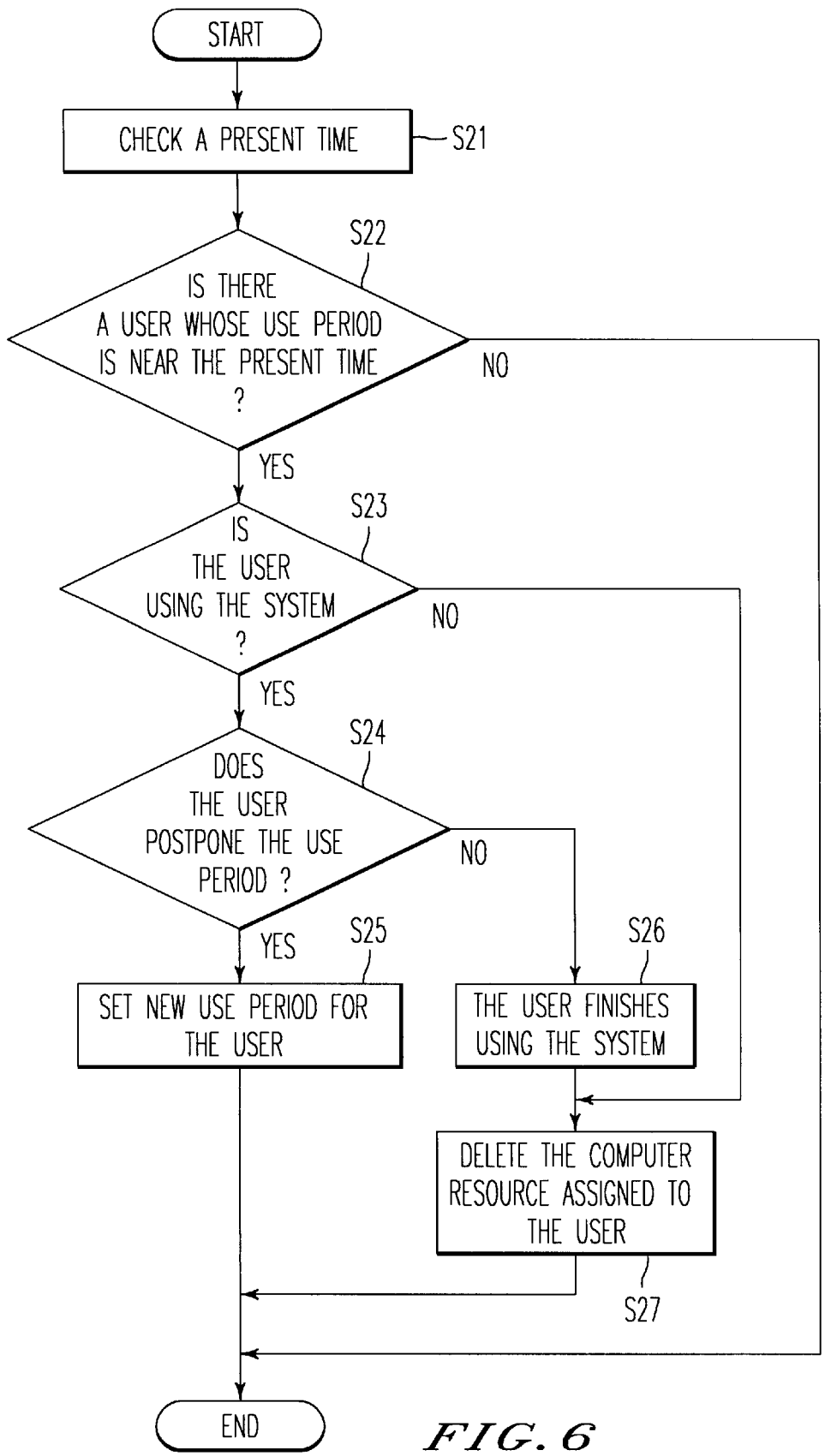
FIG. 6 is a flow chart of processing of the computer resource assignment method according to the second embodiment of the present invention.

Next, the second embodiment of the present invention is explained. FIG. 5 is a block diagram of the computer resource assignment system according to the second embodiment. In comparison with the computer resource assignment system of the first embodiment, a use period notice section 6 is the only new section of the second embodiment. An additional function of the second embodiment is a support function to postpone the use period of the temporary registration. FIG. 6 is a flow chart of the processing of the notice of the use period and the postponement of the use period according to the second embodiment. This processing is repeatedly executed at a predetermined timing, for example, at a fixed interval. First, the computer resource management section 3 examines the present time (S21). Next, by referring to the computer resource list 4, the computer resource management section 3 checks whether a temporary registered user whose use period is expired exists in the computer resource list 4 (S22). If this temporary registered user does not exist, the processing is completed. For example, assume that the present time is "October, 31th, 0:00" and content of the computer resource list 4 is shown in FIG. 7. By checking the use period 426 in the computer resource list 4, the use period "10/31 0:00" of the user ID "100" is already expired. In case the temporary registered user whose use period is expired exists, this user is determined to be using the system at present by referring to the last use date 427 in the computer resource list 4 (S23). If this user is not using the system, the computer resource assigned to this user is deleted (S27) and the processing is completed. In FIG. 7, the user of the user ID "100" is using the system because the last use date 427 of the user ID "100" is "USING". If the user whose use period has expired is using the system at the present, the computer resource management section 3 informs the use period notice section 6 that the use period is expired. The use period notice section 6 sends a message to the user terminal (S24). This message asks whether the user postpones the use period or not. If the user requests a postponement of the expiration, a new use period is set (S25). This new use period may be determined in the same way as the method of the previous use period, or a term of postponement registration may be changed (for example, when the term of the previous temporary registration is thirty days, a term of new temporary registration is shortened as ten days or prolonged as sixty days.).

On the other hand, if the user does not request an extension of the use period, the use period notice section 6 notifies the user of use completion of the system through the user terminal. After the user finishes using the system (S26), the computer resource assigned to the user is deleted (released) (S27) and the user ID "100" becomes available for another user.

Instead of the above mentioned method, before the use period is expired, a message asking whether the use period is extended may be presented to the user through the user terminal. For example, at a predetermined timing such as one hour or half a day before the use period expires, the message that the use period will expire soon is presented to the user. If the user requests an extension of the use period, the new use period is set. The use period may be extended starting from the time of the request or a previous use period. In this method, the user can previously extend the use period before the use period expires. Therefore, even if the user is not using the system when the use period expires, compulsory deletion of the computer resources assigned to the user is avoided.

As mentioned-above, in the second embodiment, a message whether the use period is to be extended is presented to the user whose use period is expired. If the user does not request a postponement of the expiration of the use period, the computer resource assigned to the user is automatically deleted. Therefore, even if the system manager is absent, the temporary registration of the user is automatically executed.

Figure 8:
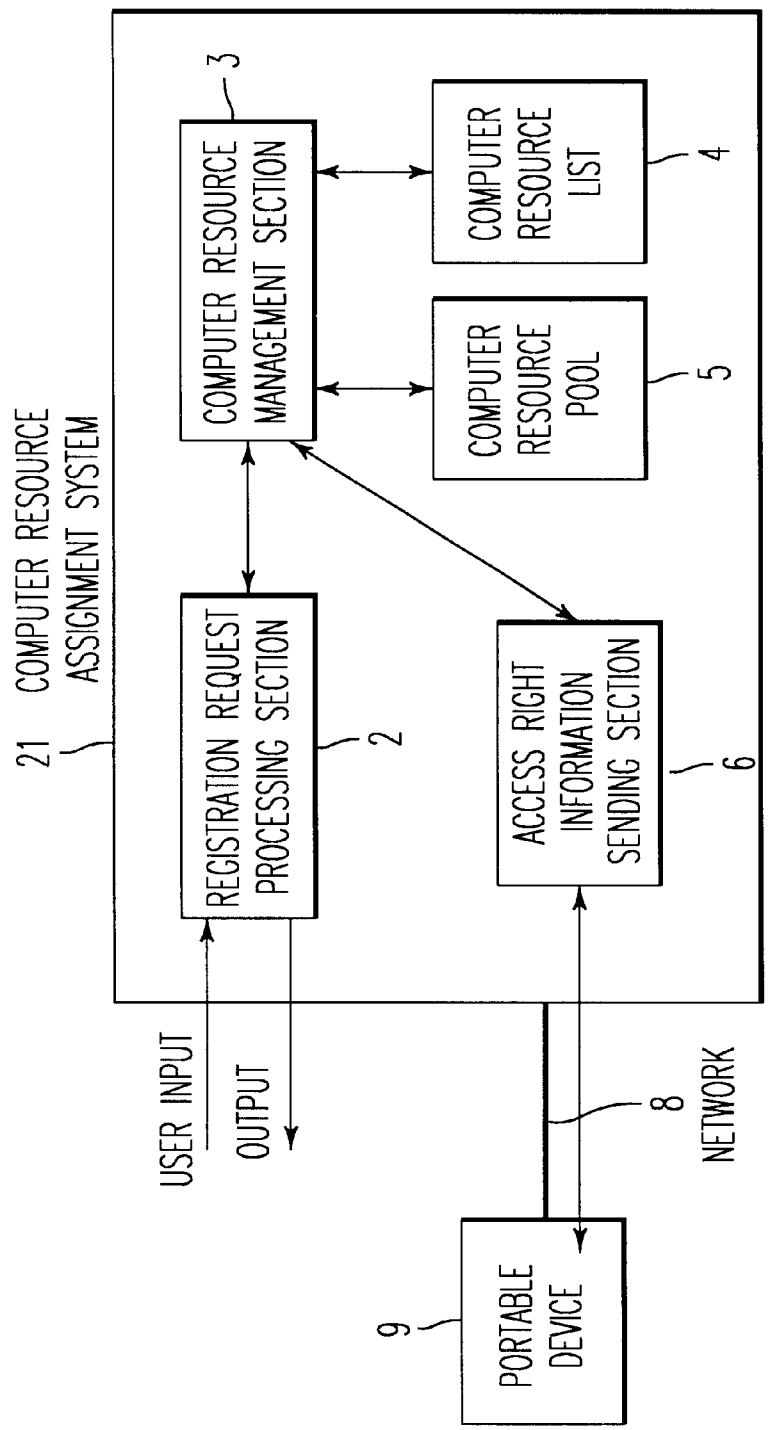
FIG. 8 is a block diagram of the computer resource assignment system according to a third embodiment of the present invention.

Next, a third embodiment of the present invention is explained. In the third embodiment, in case a portable device is connected to a network system as the user terminal, the user, who is regularly registered to one network system, connects his portable device to another network system as a temporary registered user while he is going out. FIG. 8 is a block diagram of the computer resource assignment system according to the third embodiment. In FIG. 8, in addition to the computer resource assignment system 21, the portable device 9 owned by the temporary registered user, and a network 8 linked between the computer resource assignment system 21 and the portable device 9 are included. As shown in FIG. 8, in comparison with the computer resource assignment system of the first embodiment, an access right information sending section 7 is the only new section. An additional function of the third embodiment is a support function to download the access right information such as the user ID and the group ID for the portable device 9. In short, the access right information sending section 7 sends the access right information assigned to the temporary registered user through the network 8. The access right information includes the user ID and the group ID temporarily assigned. When the user inputs the user name and the password to the registration request processing section 2 as the temporary registration, this information may be input through the user terminal connected to the network system, or through the portable device 9.

In the following explanation, assume that the user is already registered as the temporary registered user to this network system in the same way as in the first embodiment. As shown in FIG. 8, while the portable device 9 is connected to the computer resource assignment system 21 through the network 8, the access right information assigned to the user must be downloaded to the portable device 9. Therefore, the portable device 9 sends a request of access right information and the user name to the access right information sending section 7 in the computer resource assignment system 21. The access right information sending section 7 requests the computer resource management section 3 for the access right information corresponding to the user name. The computer resource management section 3 retrieves the access right information from the computer resource list 4 by using the user name, and sends the access right information to the access right information sending section 7. The access right information sending section 7 sends the access right information to the portable device 9 through the network 8. In the above explanation, the access right information is sent in response to the user's request. However, the computer resource assignment system 21 may broadcast the access right information with the user name to the portable device 9 through the network 8.

As mentioned-above, in the third embodiment, as for the access right information (user ID, group ID) assigned to the temporary registered user, the access right information is sent to the portable device of the temporary registered user through the network.

Figure 9:
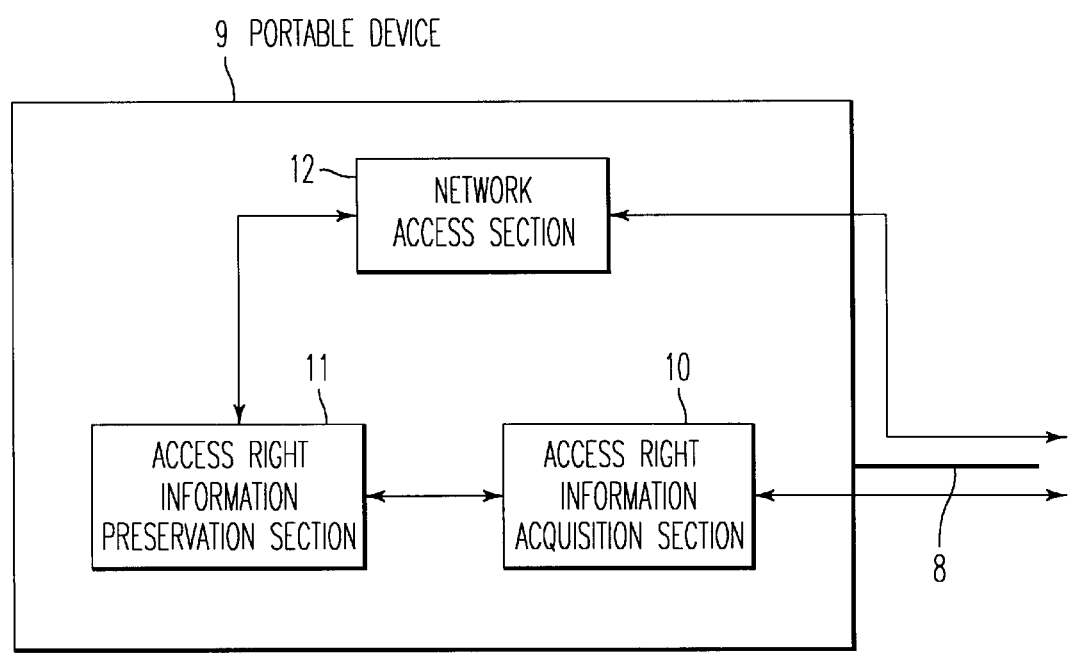
FIG. 9 is a block diagram of a portable device according to the third embodiment of the present invention.

Next, FIG. 9 is a block diagram of the portable device 9 according to the third embodiment. The portable device 9 comprises an access right information acquisition section 10, an access right information preservation section 11, and a network access section 12. The access right information acquisition section 10 acquires the access right information sent from the access right information sending section 7 through the network 8. The access right information is preserved in the access right information preservation section 11. The network access section 12 executes a network access from the portable device 9. Assume that the network system not shown in the figure is accessed by the portable device 9 according to the access right information. The access right information is necessary for the portable device 9 to access the network system. In this case, in the portable device 9, the network access section 12 requests the access right information preservation section 11 for the access right information. The access right information preservation section 11 sends the access right information to the network access section 12. The network access section 12 accesses the network system using the access right information.

Figure 10:
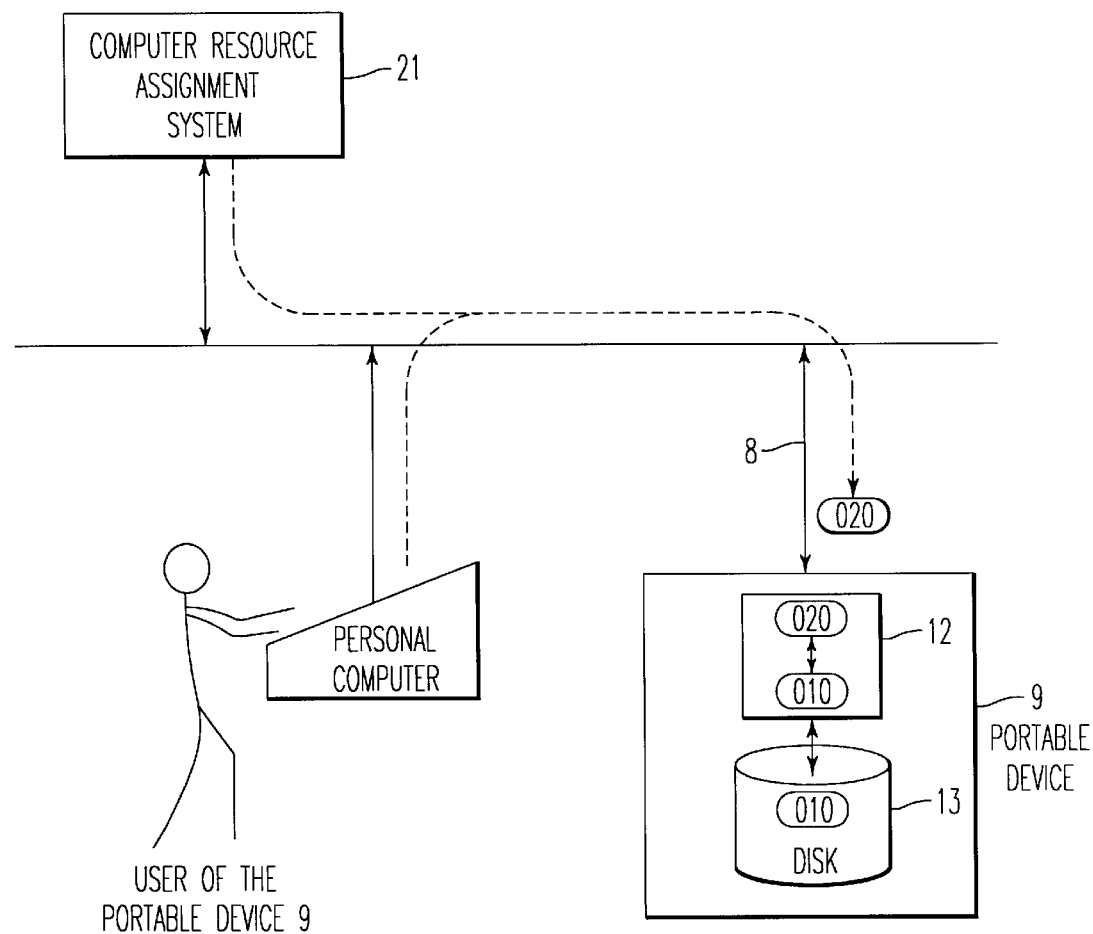
FIG. 10 is a schematic diagram of the network system which the user accesses by using the portable device according to the third embodiment of the present invention.

The portable device 9 often includes a file in stored disk 13 as shown in FIG. 10. If an access right information for the stored disk 13 is different from the access right information sent from the computer resource assignment system 21, the network access section 12 changes the access right information. For example, assume that the group ID to access the stored disk 13 in the portable device 9 is "010" and the group ID sent from the computer resource assignment system 21 is "020". In this case, in order to access the network system, the network access section changes the group ID from "010" to "020". In this way, the portable device 9 can access the network system by using the stored disk 13.

Furthermore, data pointed by the home directory in the computer resource list 4 is sometimes not preserved in the computer resource pool 5 but preserved in the stored disk 13 of the portable device 9 as shown in FIG. 10. In this case, the home directory 45 in the computer resource list 4 in FIG. 2 is expressed as "PC:/temp" representing that the home directory exists in the portable device 9. Therefore, as shown in FIG. 10, the user can access the stored disk 13 of his portable device 9 from a personal computer at another office through the network 8. In this case, the personal computer accesses the stored disk 13 by using the group ID "020" through the network 8. However, the network access section 12 changes the group ID from "020" to "010", and accesses the stored disk 13 by using the group ID "010".

As mentioned-above, in the third embodiment, the portable device 9 acquires and preserves the access right information sent from the computer resource assignment system 21. Therefore, the portable device can access the network system in another office of the user in order to use the computer resource of the network system. Furthermore, in case the stored disk 13 in the portable device 9 preserves data of the home directory, the network access section 12 changes from the access right information used for the computer resource assignment system 21 to the access right information used for the portable device 9. Therefore, even if the user goes out to another office, by connecting his portable device 9 to the network system, he can access the stored disk 13 in the portable device 9 through the personal computer at another office.

Furthermore, the use period notice section 6 of the second embodiment may be added to the computer resource assignment system 21 of the third embodiment.

A memory can be used to store instructions for performing the process described above, such a memory can be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A computer resource assignment apparatus, comprising:
   computer resource pool means for maintaining a plurality of computer resources to be assigned to a temporary registered user;
   computer resource list means for previously storing a plurality of user identifiers to be assigned to the temporary registered user;
   registration request processing means for receiving a temporary registration request from a terminal of a user, the user being the temporary registered user;
   computer resource management means for selecting an unused user identifier from the plurality of user identifiers in said computer resource list means, for assigning the unused user identifier as a user identifier to the temporary registered user, for selecting a computer resource of an empty area from the plurality of computer resources in said computer resource pool means, for assigning a home directory representing an address of the computer resource to the temporary registered user, for assigning a group identifier representing an access right of the computer resource to the temporary registered user, and for setting a use period of the computer resource assigned to the temporary registered user; and use period notice means for sending a message that the present time is near the end of the use period to the terminal of the temporary registered user when the present time is near the end of the use period of the temporary registered user, wherein said computer resource list means correspondingly registers the user identifier, the home directory, the group identifier, the use period, a user name and a password of the temporary registered user, and wherein said computer resource management means deletes the registered information of the temporary registered user in said computer resource list means, if the temporary registered user does not input an extension registration request through the terminal in reply to the message.

2. The computer resource assignment apparatus according to claim 1, wherein said registration request processing means informs the temporary registered user that a user identifier of the temporary registered user is not secured through the terminal, if the unused user identifier does not exist in the plurality of user identifiers stored in said computer resource list means.

3. The computer resource assignment apparatus according to claim 1, wherein said computer resource management means checks whether the same user name is already registered in said computer resource list means, when said registration request processing means receives the user name from the terminal of the temporary registered user.

4. The computer resource assignment apparatus according to claim 3, wherein said registration request processing means requests the temporary registered user to input another user name through the terminal, if the same user name is already registered in said computer resource list means.

5. The computer resource assignment apparatus according to claim 3, wherein said computer resource list means registers the user name, if the same user name is not registered yet in said computer resource list means.

6. The computer resource assignment apparatus according to claim 1, wherein said computer resource list means registers the password, when said registration request processing means receives the password from the terminal of the temporary registered user.

7. The computer resource assignment apparatus according to claim 1, wherein said computer resource management means sets an extended use period for the temporary registered user in said computer resource list means, if the temporary registered user inputs an extension registration request through the terminal in reply to the message.

8. The computer resource assignment apparatus according to claim 1,
wherein the user identifier of the temporary registered user becomes available as the unused user identifier in said computer resource list means after said computer resource management means deletes the registered information of the temporary registered user in said computer resource list means.

9. The computer resource assignment apparatus according to claim 1, wherein said computer resource list means registers a last use date representing a date when the temporary registered user used the computer resource assignment apparatus last.

10. The computer resource assignment apparatus according to claim 9, wherein said computer resource management means checks whether the temporary registered user of the user identifier is presently using the computer resource assignment apparatus by referring to the last use date in said computer resource list means, if the user identifier of which the use period expired exists in said computer resource list means.

11. The computer resource assignment apparatus according to claim 10, wherein said computer resource management means deletes the registered information of the temporary registered user in said computer resource list means, if the temporary registered user of the user identifier is not presently using the computer resource assignment apparatus.

12. The computer resource assignment apparatus according to claim 10, wherein said use period notice means sends a message asking whether the temporary registered user postpones the use period to the terminal of the temporary registered user, if the temporary registered user of the user identifier is presently using the computer resource assignment apparatus.

13. The computer resource assignment apparatus according to claim 12, wherein said computer resource management means sets an extended use period for the temporary registered user in said computer resource list means, if the temporary registered user inputs an extension registration request through the terminal in reply to the message.

14. The computer resource assignment apparatus according to claim 12, wherein said use period notice means notifies the temporary registered user of use completion of the computer resource assignment apparatus through the terminal, if the temporary registered user does not input an extension registration request through the terminal in reply to the message.

15. The computer resource assignment apparatus according to claim 14, wherein said computer resource management means deletes the registered information of the temporary registered user in said computer resource list means, when the temporary registered user finishes using the computer resource assignment apparatus.

16. The computer resource assignment apparatus according to claim 1, further comprising:
an access right information sending means for sending an access right information of the computer resource assigned to the temporary registered user to the terminal of the temporary registered user,
wherein the access right information includes the user identifier and the group identifier of the temporary registered user.

17. The computer resource assignment apparatus according to claim 1, wherein said registration request processing means confirmatively sends each information to the terminal of the temporary registered user, whenever said computer resource list means registers each information of the temporary registered user.

18. A computer resource assignment method, comprising:
maintaining a plurality of computer resources to be assigned to a temporary registered user in a computer resource pool;
previously storing a plurality of user identifiers to be assigned to the temporary registered user in a computer resource list;

receiving a temporary registration request from a terminal of a user, the user being the temporary registered user;

selecting an unused user identifier from the plurality of user identifiers in the computer resource list;

assigning the unused user identifier as a user identifier to the temporary registered user;

selecting a computer resource of an empty area from the plurality of computer resources in the computer resource pool;

assigning a home directory representing an address of the computer resource to the temporary registered user;

assigning a group identifier representing an access right of the computer resource to the temporary registered user;

setting a use period of the computer resource assigned to the temporary registered user;

correspondingly registering the user identifier, the home directory, the group identifier, the use period, a user name and a password of the temporary registered user in the computer resource list;

sending a message that the present time is near the end of the use period to the terminal of the temporary registered user when the present time is near the end of the use period of the temporary registered user; and deleting the registered information of the temporary registered user in the computer resource list if the temporary registered user does not input an extension registration request through the terminal in reply to the message.

19. A computer readable memory containing computer-readable instructions, comprising:

instruction means for causing a computer to maintain a plurality of computer resources to be assigned to a temporary registered user in a computer resource pool;

instruction means for causing a computer to previously store a plurality of user identifiers to be assigned to the temporary registered user in a computer resource list;

instruction means for causing a computer to receive a temporary registration request from a terminal of a user, the user being the temporary registered user;

instruction means for causing a computer to select an unused user identifier from the plurality of user identifiers in the computer resource list;

instruction means for causing a computer to assign the unused user identifier as a user identifier to the temporary registered user;

instruction means for causing a computer to select a computer resource of an empty area from the plurality of computer resources in the computer resource pool;

instruction means for causing a computer to assign a home directory representing an address of the computer resource to the temporary registered user;

instruction means for causing a computer to assign a group identifier representing an access right of the computer resource to the temporary registered user;

instructions means for causing a computer to set a use period of the computer resource assigned to the temporary registered user;

instruction means for causing a computer to correspondingly register the user identifier, the home directory, the group identifier, the use period, a user name and a password of the temporary registered user in the computer resource list;

instruction means for causing a computer to send a message that the present time is near the end of the use period to the terminal of the temporary registered user when the present time is near the end of the use period of the temporary registered user; and instruction means for causing a computer to delete the registered information of the temporary registered user in the computer resource list if the temporary registered user does not input an extension registration request through the terminal in reply to the message.

20. A computer resource assignment apparatus, comprising:

a computer resource pool configured to maintain a plurality of computer resources to be assigned to a temporary registered user;

a computer resource list configured to previously store a plurality of user identifiers to be assigned to the temporary registered user;

a registration request processing unit configured to receive a temporary registration request from a terminal of a user, the user being the temporary registered user;

a computer resource management unit configured to select an unused user identifier from the plurality of user identifiers in said computer resource list, to assign the unused user identifier as a user identifier to the temporary registered user, to select a computer resource of an empty area from the plurality of computer resources in said computer resource pool, to assign a home directory representing an address of the computer resource to the temporary registered user, to assign a group identifier representing an access right of the computer resource to the temporary registered user, and to set a use period of the computer resource assigned to the temporary registered user; and a use period notice unit configured to send a message that the present time is near the end of the use period to the terminal of the temporary registered user when the present time is near the end of the use period of the temporary registered user, wherein said computer resource list correspondingly registers the user identifier, the home directory, the group identifier, the use period, a user name and a password of the temporary registered user, and wherein said computer resource management unit deletes the registered information of the temporary registered user in said computer resource list if the temporary registered user does not input an extension registration request through the terminal in reply to the message.

* * * * *